Nov. 26, 1946.  F. LE G. BRYANT  2,411,613
METERING DEVICE
Filed May 25, 1942  3 Sheets-Sheet 1
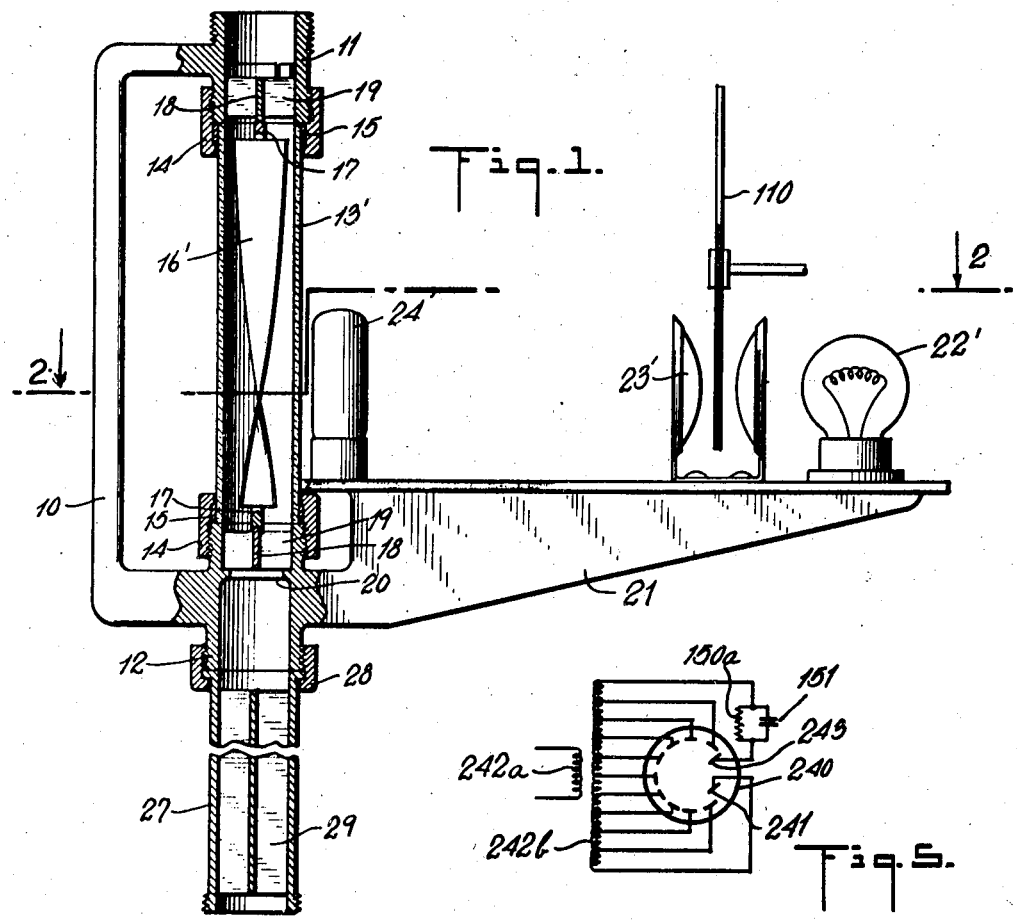
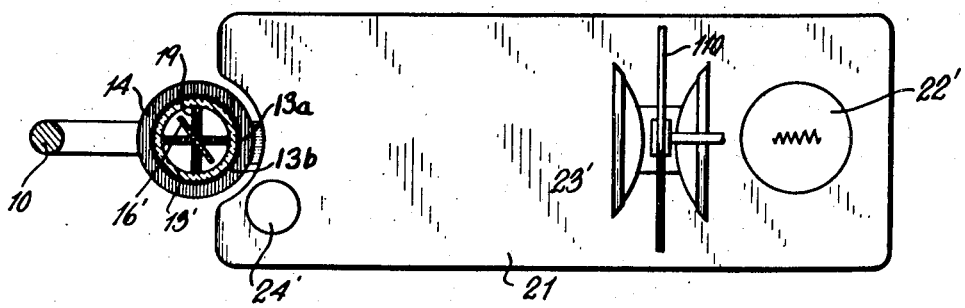
INVENTOR
Forest Le Grand Bryant
BY
Kenyon & Kenyon
ATTORNEY

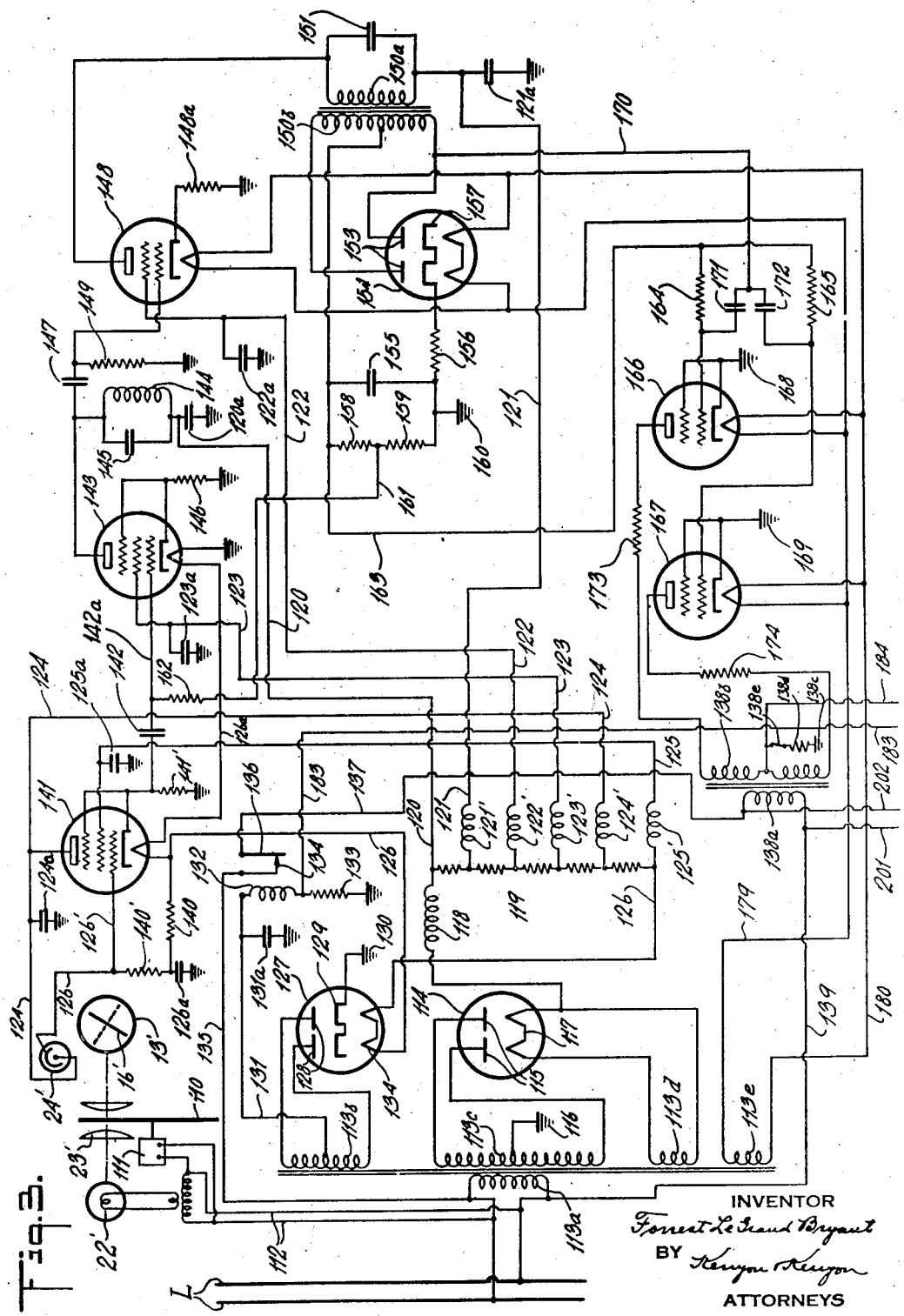

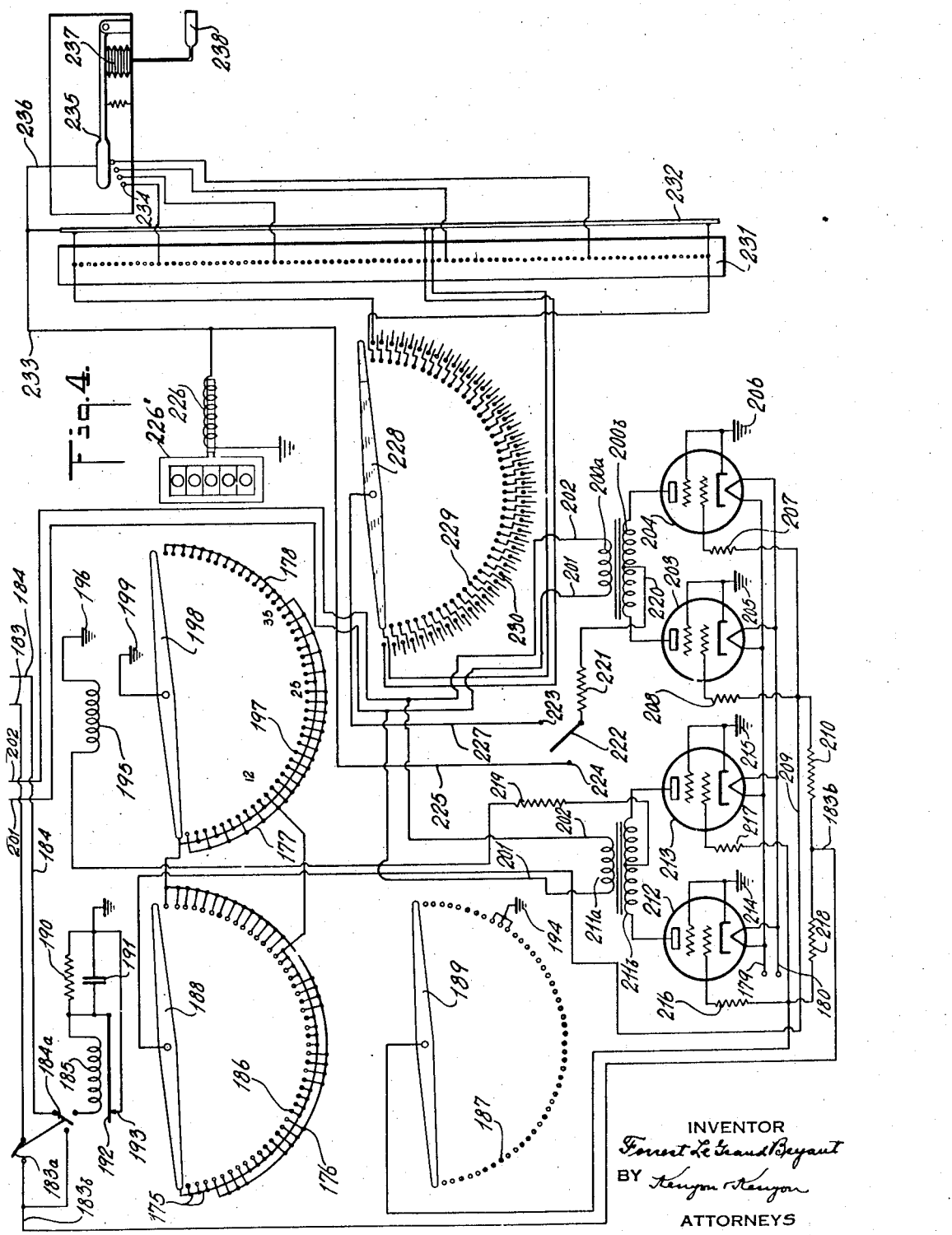

Patented Nov. 26, 1946

2,411,613

UNITED STATES PATENT OFFICE 2,411,613

METERING DEVICE

Forrest Le Grand Bryant, New York, N. Y., assignor to Jensen Machinery Company, Inc., Bloomfield, N. J., a corporation of New York Application May 25, 1942, Serial No. 444,357

6 Claims. (Cl. 73—231)

This invention relates to the art of metering the flow of fluids or other flowable material and has for its object the provision of a simple and accurate apparatus for measuring such flow.

An additional object is the provision of an apparatus which offer very little restriction to the flow.

Another object is the provision of an apparatus which may be easily disassembled for cleaning.

A further object of this invention is a metering device of simple structure which may be easily taken apart for cleaning and which meets all the requirements promulgated by the boards of health with respect to apparatus used in the handling of food products.

Another object of this invention is a metering device having provision to effect compensation for change in the specific gravity of the liquid being metered due to temperature variation in the liquid during the metering operation.

A still further object of the invention is a metering device in which the number of rotations of a metering member is registered through the intermediary of variations in light intensity effected by rotation of the metering member.

In a preferred embodiment of the invention, liquid or other material to be metered is passed through a light-transmitting tube wherein it causes a movably mounted member to rotate at a speed proportional to the rate of flow. The rotational member is arranged to be interceptive of a light beam and causes the beam to be interrupted in such a manner as to cause a state of high illumination in one part of the liquid and a relatively low state of illumination in another part of the liquid or an almost complete interruption of the beam or a reflection or refraction thereof. The rotation of the member causes a succession of periods when a relatively high or relatively low state of illumination exists or a succession of interruptions or reflections or refractions of the light beam. The interrupted beams of light or the succession of high illuminations, reflections or refractions are supplied to a photo-electric cell, thereby causing such cell to become capable of conducting current proportional to or approximately proportional to the state of illumination. Thus, the number of rotations of the member is impressed on the photo-electric cell as periods of increased conductivity of such cell, and usually there are two periods for each complete revolution of the member. Electrically actuated counting means are controlled by the photo-electric cell in response to the variation in the intensity of illumination so that the counting means registers the volume of material flowing through the tube in a given time.

One field of use for the metering device is in the measurement of the flow of milk or other similar liquid. Certain characteristics of the apparatus are definitely advantageous to the measurement of milk flow, particularly since the transmission factor of milk for the passage of light is relatively low. Therefore, for milk-metering apparatus, the photo-electric cell is mounted in close proximity to the light-transmitting tube and in relatively close proximity to the point of contact of the light beam with the light-transmitting tube. The rotating member preferably is of spiral form mounted on bearings with its rotational axis intersecting the light beam axis and lying in a plane with the axis of the photo-electric cell and divides the column of liquid into two equal parts. During that portion of the rotation of said member that one edge is in the arc between the light beam axis and the plane of its rotational axis and the photo-electric cell axis, a state of low illumination exists in that portion of the column of liquid which supplies light to the photo-electric cell, while a high state of illumination exists in the remainder of the liquid column. After the edge of the rotating member has left the end of said arc, a state of high illumination exists in that portion of the column of liquid which supplies light to the photo-electric cell until the remaining edge of said member passes across the light beam axis. This, of course, occurs twice for each revolution of the member. With this arrangement, advantage is taken of the light which is reflected from the solids and/or fat in the milk and each time such light is reflected from the milk, the photo-electric cell is placed in a state of relatively high conductivity for the purpose of actuating the indicating or counting means. In the case of relatively transparent liquid such, for example, as beer, a beam of light may be directed straight or nearly straight through the liquid, in which case, the photo-electric cell would be mounted on one side of the light-transmitting tube and the light beam would enter the light-transmitting tube at a point less adjacent to the photo-electric cell and possibly directly opposite to said cell.

In practice, it has been found that the most effective light rays for use with milk are the infra-red rays. For this reason, a high wattage tungsten filament lamp preferably is used as the light source and is operated on a fraction of its rated voltage. Such a lamp supplies an abundance of the infra-red rays and the use of the low voltage greatly increases its life. Also, a filter may be used to filter out approximately all light rays except the infra-red. The operation of the device is approximately as positive using only the infra-red rays from the light source as when using the total light. This has advantage in the case of voltage drop since the decrease in total light would be approximately inversely proportional to the third power of the drop in voltage where the decrease in infra-red radiation would be inversely proportional to approximately one-half one power of the drop in voltage.

It has been found when measuring milk with the measuring device of this invention, that under certain conditions, an extreme variation occurs in the light transmission factor of the milk due to varying percentage in its butter fat content. In the case of milk pumped from a large tank in which stratification of the cream has taken place, the milk from the lower part of the tank and passing through the device first may contain 1 or 2% butter fat and have a relatively high light-transmission factor, whereas milk that was originally in the top part of the tank and which passes through the measuring device later may have a butter fat content as high as 10% and consequently a much lower light-transmission factor. It is therefore necessary to provide means for highly amplifying the signals from the photo-electric cell in the case of high butter fat content and relatively low light transmission factor and to provide that the amplification will be automatically reduced in the case of low butter fat content and relatively high light-transmission factor.

Preferably, the counter is calibrated to register the amount of liquid metered in weight units rather than in volume units and, therefore, variation in the specific gravity of the liquid being pumped must be taken into consideration. For this reason, means are provided connected in such a manner that electrical adjustment may be made either automatically or manually so that the count registered on the counter may bear any desired relation to the number of revolutions of the rotatable member.

Other objects, novel features and advantages of this invention will become apparent from the following specification and accompanying drawings, wherein:

Fig. 1 illustrates partly in section and partly in elevation the mechanical portion of an apparatus embodying the invention;

Fig. 2 is a plan view of Fig. 1;

Figs. 3 and 4 together are a wiring diagram of the electrical portion, and

Fig. 5 is a further modification.

In the embodiment disclosed in Figs. 1 to 4, a metal bracket 10 is provided with two spaced alined tubular portions 11 and 12 which are provided with exterior threads. A glass tube 13' coated with opaque material is interposed between the adjacent ends of the tubular portions 11 and 12 and is held in place by nuts 14 with suitable packing 15 provided to form fluid-tight joints. The tube 13' is equipped with windows 13a and 13b and within said tube is provided a member 16' consisting of a spirally twisted metal ribbon provided at its opposite ends with axial studs 17. The axial studs 17 cooperate with pins 18 carried by spiders 19 to rotatably support the member 16'. Each spider 19 snugly fits the tubular portion in which it is arranged and is removable therefrom while the bottom spider rests upon an annular flange 20 provided in the tubular portion 12, the flange serving to locate the member 16' in proper relation to the windows 13a and 13b of tube 13'. Passage of a stream of liquid or a stream of small solids through the tube 13' effects rotation of the member 16'.

The bracket 10 is provided with a platform 21 on which is supported a light source 22' in combination with a condenser lens 23' for directing a beam of light to the window 13a of the tube 13'. Also, the table 21 supports a photo-electric cell 24' so arranged as to have its cathode facing the window 13b of the tube 13'. A toothed disk 110, rotated by a motor 111, is arranged to modulate the light beam to audio frequency range of about 700 cycles per second. Electrical energy for the light source 22' and the motor 111 is supplied from a power circuit L through conductors 112. Preferably, a casing (not shown) is provided for enclosing the light source 22' and photo-electric cell 24' to exclude extraneous light from the photo-electric cell and make it responsive only to light from the source 22'.

A transformer has its primary 113a bridged across the power line L and is provided with several secondaries 113b, 113c, 113d, 113e, respectively. A conventional full wave rectifier 114 has its two anodes 115 connected to opposite terminals of the secondary 113c, the midpoint of which is grounded at 116 and has its cathode 117 bridged across the secondary 113d. The cathode 117 is connected through an inductance 118 to one terminal of a potential divider 119 from various points of which lead conductors 120, 121, 122, 123, 124, 125, with the last five leading through inductances 121', 122', 123', 124', 125', and conductor 126.

A second full wave rectifier 127 has its two anodes 128 connected to opposite ends of the secondary 113b and has its cathode 129 grounded at 130. The center point of the secondary 113b is connected by conductor 131 to ground through a relay coil 132 and resistance 133 and a grounded condenser 131a is connected to the conductor 131 ahead of the relay coil 132. The fixed contact 134 of the relay is connected by conductor 135 to one side of the power line L and the movable contact 136 of the relay is connected through conductor 137 to one terminal of a transformer primary 138a, the other terminal of which is connected through conductor 139 to the remaining side of the power line L.

The conductor 124 leads to the anode of the photo-electric cell 24' while the conductor 126 leads through the cathode heater of the rectifier 127 and resistances 140 and 140' to the cathode of the photo-electric cell 24'. A grounded condenser 124a is connected to the conductor 124 and a grounded condenser 126a is connected between the resistances 140 and 140'.

A pentode voltage amplifier electron discharge device 141 is connected to photo-electric cell circuit as an impedance transformer. The cathode of the photo-electric cell 24' is connected through conductors 126 and 126' to the control electrode of 141 while the anode of 141 is connected to the conductor 124. The suppressor electrode and cathode of 141 are connected together and are grounded through the resistance 141' and the screen electrode of 141 is connected to the conductor 125 to which is connected a grounded condenser 125a.

The cathode and suppressor electrode of 141 are connected through a condenser 142 to the control electrode of a pentode voltage amplifier electron discharge device 143. The anode of 143 is connected to the conductor 120 to which is connected a grounded condenser 120a, through inductance 144, across which is bridged a condenser 145 to form a tuned circuit. The suppressor electrode and the cathode of 143 are connected through resistance 146 to ground. The screen electrode of 143 is connected to conductor 123 to which is connected a grounded condenser 123a. The heaters for 141 and 143 are supplied with energizing current through the conductor 126 and branch conductor 126a.

The anode of 143 is connected through a condenser 147 to the control electrode of a beam power amplifier electron discharge device 148 and said control electrode is connected to ground through a resistance 149. The anode of 148 is connected to conductor 121 to which is connected grounded condenser 121a, through transformer primary 150a which is bridged by the condenser 151 to form a tuned circuit. The screen electrode of 148 is connected to the conductor 122 to which is connected a grounded condenser 122a.

The terminals of the transformer secondary 150b are connected to the anodes 153 of the full wave rectifier 154 and the midpoint of transformer secondary 150b is connected through a condenser 155 and resistance 156 to the cathode 157 of 154. A pair of resistances 158 and 159 are bridged across the condenser 155, the positive terminal of which is grounded at 160. A conductor 161 leads from the connection between resistances 158 and 159 through a resistance 162 to the control electrode of 143.

The negative terminal of condenser 155 is connected through conductor 163 and equal resistances 164 and 165 respectively to the control electrodes of gas-filled tetrodes 166 and 167, the cathodes and shield electrodes of which are grounded respectively at 168 and 169. One terminal of the transformer secondary 150b is connected through the conductor 170 and condensers 171 and 172 respectively to the control electrodes of the tetrodes 166 and 167. The anodes of 166 and 167 are connected through resistances 173 and 174 to opposite terminals of the transformer secondary 138b. The heaters for the cathodes of 154, 166 and 167 are furnished with current from the transformer secondary 113e by conductors 179 and 180.

A conductor 183 leads from the connection between the coil 132 and the resistance 133 to the blade 183a of a single blade single-throw switch, the contact of which is connected to conductor 183b. The center point of the transformer secondary 138b (the midpoint of the transformer secondary 138b) is grounded at 138c through a resistance 138d and a switch 138e and also is connected through conductor 184 to the blade 184a of a single blade two-throw switch having two contacts, one of which is connected to the conductor 183b and the other of which is connected to one terminal of the operating coil 185 of a 50-point rotary switch having two banks of contacts 186 and 187 and wipers 188 and 189 respectively for said banks, the remaining terminal of the coil 185 being connected to ground through the resistance 190. The resistance 190 is bridged by a condenser 191 and a circuit including a stationary contact 192 and a movable contact 193, the former of which normally engages the latter but is caused to move out of engagement therewith upon flow of current through the coil 185.

Preferably, the blades 183a and 184a are interconnected for simultaneous movement so that the blade 183a closes the circuit between conductors 183 and 183b only when the blade 184a engages the contact connected to the coil 185.

The first 36 contacts of the bank 186 are divided into 9 groups of four contacts each and the alternate groups are connected to conductors 175 and 176 in such manner that one set of groups contains 20 contacts while the other set contains 16 contacts and the 16-contact set is connected to the 14 remaining contacts. Thus, the wiper 188 in each half revolution makes nine changes in contact between the two sets of contacts. The contacts of the bank 187 are all open except the 40th, 41st and 42nd contacts which are grounded at 194.

A secondary rotary switch has an operating coil 195, one end of which is grounded at 196. This switch has a single bank of contacts 197 and a wiper 198 which is grounded at 199. The first 12 contacts 197 are alternately connected to a first conductor 177 and a second conductor 178 and contacts 13 to 25 are connected to the first conductor while contacts 26 to 35 are alternately connected to the two conductors and the remaining contacts are connected to the second conductor. The conductors 175 and 176 are connected respectively to conductors 177 and 178.

A transformer primary 200a is bridged across the transformer primary 138a by conductors 201 and 202. The transformer secondary 200b has its terminals connected to the anodes of gas-filled tetrodes 203 and 204, the suppressor electrodes and cathodes of which are grounded at 205 and 206 respectively. The control electrodes of tetrodes 203 and 204 are connected through the resistances 207 and 208 and conductor 209 to the rotary switch wiper 188 and are connected through resistance 210 to conductor 183b.

A second transformer primary 211a is bridged across the transformer primary 138a by conductors 201 and 202. The opposite terminals of the transformer secondary 211b are connected to the anodes of gas-filled tetrodes 212 and 213 respectively, the suppressor grids and cathodes of which are grounded respectively at 214 and 215. The control electrodes of 212 and 213 are connected respectively through resistances 216 and 217 to the rotary switch wiper 189 and through resistance 218 to conductor 183b. The midpoint of transformer secondary 211b is connected through resistance 219 to the second switch actuating coil 195. The filaments of 203, 204, 212 and 213 are supplied with current from transformer secondary 113e through conductors 179 and 180.

The midpoint of transformer secondary 200b is connected through conductor 220 and resistance 221 to the blade of a single blade double-throw switch 222 having two contacts 223 and 224. A conductor 225 leads from the contact 224 to one terminal of the actuating coil 226 of a magnetic counter and the remaining terminal of said coil is grounded. The contact 223 is connected through conductor 227 to the wiper 228 of a rotary switch having two banks of contacts 229 and 230. The wiper 228 is advanced by a stepping coil (not shown) but similar to the stepping coils 185 and 195 for the wipers 188 and 189 of the two previously described rotary switches. The wiper 228 is of such construction that one arm engages only the contacts of the bank 229 and the other arm engages only the contacts of the bank 230, and is advanced one step for each impulse flowing through the conductor 220 in the usual manner for switches of this type. The contacts of the two banks 229 and 230 are progressively connected to contacts supported by a panel 231 of insulating material, all of which panel contacts except four are in turn connected to a bus bar 232 having one end connected through the conductor 233 to one terminal of the actuating coil 226 of the counter 226'. (In order to avoid a confusing multiplicity of lines, only four switch contacts are shown as connected to panel contacts, but it is to be understood that all of the switch contacts are connected to panel contacts.) The four panel contacts above mentioned as not being connected to the bus bar are connected to contacts 234 and a wiper 235 is provided to engage the contacts 234 successively so as to be in engagement with one to four of said contacts, depending upon the position of the wiper. A conductor 236 leads from the wiper 235 to the conductor 233. The wiper 235 is actuated by a thermostat 237 having its bulb 238 arranged in the liquid stream. By proper manipulation of the switch 222, the midpoint of the transformer secondary 200b can be connected to the operating coil 226 either through merely the resistance 221 or through the resistance 221, rotary switch and panel contacts.

In the operation of the device, the light transmitted through the tube 13' to the photo-electric cell 24' is dependent upon the position of the rotor 16' which is rotated by flow of liquid through the tube 13'. The photo-electric cell is subjected to maximum and minimum illumination once for each half revolution of the rotor 16'. The current flowing from the anode to the cathode of photoelectric cell 24' fluctuates as the illumination changes. The output of the photo-electric cell has an alternating current component of the same frequency as the light interruption produced by the wheel 110.

The rectifier 127 supplies a negative potential to the conductor 183 and energizes the coil 132 to move the contact 136 into engagement with the contact 134 after the filament of rectifier tube 114 and the cathode of 127 have successively been heated to emitting temperature.

Positive potential is supplied to the anode of the photo-electric cell 24' through conductor 124 while the cathode of 24' is connected through conductor 126 and resistances 140' and 140 to the least positive terminal of the voltage divider 119. Constant positive potential is impressed on the anode of 141 through conductor 124 and on the screen electrode of 141 through conductor 125. A positive bias is supplied to the control electrode of 141 through the conductor 126' by the resistances 140' and 140.

The alternating current component of the photo-electric cell current flows through a circuit consisting of grounded condenser 124a, conductor 124, photo-electric cell 24', conductor 126, resistance 140' and grounded condenser 126a. Thus, there is across resistance 140' a potential that has an alternating current component of a frequency controlled by the toothed disk 110 and modulated by the member 16'. This alternating current potential is amplified by the three-stage amplifier consisting of the electron discharge devices 141, 143 and 148. The alternating current component of the voltage across the resistance 140' appears across resistance 141' which is only a small fraction (1/1000) of resistance 140' thereby making it possible for the conductor 142a to be considerably lengthened to permit separation of the amplifier 141, tube 13', photo-electric cell 24', lens 23', motor 111, and light source 22' from the other parts of the mechanism. Also, it eliminates possible instability in electron discharge device 143 which might develop if the high resistance 140' were connected directly into the grid circuit of 143.

The voltage across resistance 141' is impressed through the conductor 142a on the control grid of 143 and a constant positive potential is impressed on the screen electrode of 143 through the conductor 123. The cathode and suppressor electrode of 143 are connected to ground through resistance 146 to provide self-bias for the control electrode. Anode voltage is supplied through conductor 120 and the inductance 144.

The output voltage of 143 is fed through condenser 147 to the control electrode of 148. A constant potential is provided on the screen electrode of 148 through conductor 122 and the cathode of 148 is connected to ground through the resistance 148a to provide self-bias for the control grid of 148. Plate voltage is supplied to 148 through conductor 121 and the tuned transformer primary 150a.

The output of the amplifier is rectified by the rectifier 154 and is impressed upon condenser 155 through the resistance 156 to charge the condenser. The resistances 158 and 159 are of such value as to give the condenser resistance network a time constant considerably lower than the slowest rotation of the member 16'. By the conductor 161 there is provided a control bias to regulate the gain of the amplifier in the manner of an automatic volume control circuit to compensate for fluctuation in the light-transmission factor of the liquid being metered. The potential on the control grids of 166 and 167 is supplied respectively from successive half-waves of the alternating current by resistances 164 and 165 from condenser 155 and through condensers 171 and 172 from transformer secondary 150b. The potential from condenser 155 is a negative potential which is self-regulating in magnitude to compensate for the varying strength of the signal from the transformer secondary 150b. Thus, as the fluctuating light flux that falls on the entrance window of 13' is modulated by the member 16', the tetrodes 166 and 167 become alternately conducting and non-conducting as the alternating current potential from the transformer secondary 150b becomes greater or less than average potential on condenser 155.

With the blade 183a in circuit-open position and the blade 184a in position to close-circuit the conductors 184 and 183b and the switch 138e closed, the midpoint potential of the transformer secondary 138b is impressed on the control electrodes of the tetrodes 203 and 204. This potential fluctuates between two values, one of which is more positive than the other, thereby rendering the tetrodes 203 and 204 alternately conductive and non-conductive. Upon the tetrodes 203 and 204 becoming conductive, current flows through the transformer secondary 200b to provide impulses for actuating the counter, such impulses being in one to one ratio with the half revolutions of the rotor 16'.

The rotary switches in combination with the tetrodes 212 and 213 provide means for securing an adjustable ratio between the number of half revolutions of the member 16' and the number of counter-actuating impulses. Such means is rendered operative by opening the switch 138e and by moving the blade 183a into circuit-closing position, thereby simultaneously moving the blade 184a into position to close the circuit from 184 to 185.

Power from transformer secondary 138b controlled by the tetrodes 166 and 167 is fed through the conductor 184 to the operating coil 185 of the two-bank rotary switch and the wipers 188 and 189 are advanced one step for each current impulse in the well-known manner. In order to provide an adjustable ratio between the revolutions of the member 16' and the number shown on the counter, the connections shown on the drawings are provided. The wiper 198 can ground either conductor 177 or 178 and contacts 186 connected thereto as the wiper moves over successive contacts 197 while the wiper 188 can connect either conductor to the control electrodes of gas-filled tetrodes 203 and 204. Thus, if wipers 188 and 198 are both connected to the same group of contacts 186, then the tetrodes 203 and 204 will conduct respectively for successive half-waves of the alternating current. If, however, the wipers 188 and 198 are not connected to the same group of contacts 186, negative potential from 183 to the control electrodes will cause the tetrodes 203 and 204 to become non-conductive respectively for successive half-waves of the alternating current. Thus, if either wiper 188 or 198 moves from connection with one group of contacts 186 to connection with the other group of contacts and then back to connection with the first group, it will cause the addition of one digit on the counter 226. The wiper 189 by engagement with the grounded contacts 187 causes energizing current to flow through the coil 195 thereby moving wiper 198 ahead one contact on bank 197 through operation of the tetrodes 212 and 213 for every fifty contacts which switch 185 makes. The connections of the contacts as shown in Fig. 4 provide a ratio between each half revolution of the member 16' and the actuating impulses of the counter so that the counter will be advanced corresponding to the half turns of the member 16' if the coil 226 is connected directly to the resistance 221.

In the event that the metering device is being used for liquid such as milk or cream, the density of which remains substantially constant over a wide range of temperatures, the blade of the switch 222 is engaged with the contact 224 so that impulses from the transformer secondary 200b are supplied directly to the coil 226 of the counter. However, in the event that the liquid being metered is gasoline or the like in which a change of density results from a slight change in temperature, the blade of the switch 222 is engaged with the contact 223 so that the impulses from the transformer secondary 200b are supplied to the wiper 228 of the rotary switch and to its stepping mechanism. The number of impulses transmitted to the counter depend upon the position of the wiper 235 which in turn depends upon the temperature of the liquid being metered. With the liquid at one temperature, the wiper 235 engages all the auxiliary contacts 234 so that all the impulses from the transformer secondary 220b are supplied from the switch contacts, panel contacts and auxiliary contacts to the coil 226. However, with the liquid at a higher temperature with a resulting decrease in the density of the liquid, the thermostat 237 is operated to disengage the wiper 235 from one or more of the auxiliary contacts, thereby correspondingly reducing the number of impulses which are transmitted from the transformer secondary 220b to the coil 226.

When the metering device above described is utilized to measure cream, the percentage of butter fat in the cream can be determined by the magnitude of the photo-electric cell output through the medium of known equipment not here shown. With this arrangement, the intensity of the light supplied to the photo-electric cell is varied in timed relation to the rotational speed of the member 16' and the same circuit arrangements can be used to actuate the counting means as above described. If desired, a synchronous motor may be used as the counter-actuating means.

In the embodiment of Fig. 5, the tube 24' and the amplifying system consisting of the electron discharge devices 141, 143 and 148 are replaced by a multiplier phototube 240 having a light-responsive element, such last-named tube being a commercial product put out by Radio Corporation of America. Light from the tube 13' is directed to the photo-cathode 241 which is connected to one terminal of a transformer secondary 242b and the anode 243 is connected to the remaining terminal of 242b through the tuned circuit consisting of 150a and 151. Power is supplied to 241 through the transformer primary 242a and the dynodes of the tube 240 are connected to intermediate points of 242b. The output of 241 corresponds to the output of 148 in Figs. 6 and 7.

Furthermore, it is to be understood that various modifications may be made in the above-described device without in any way departing from the spirit of the invention as defined in the appended claims.

This application is a continuation-in-part of applicant's co-pending application, Ser. No. 363,238, filed October 29, 1940, Metering devices.

I claim:

1. In combination, a conduit, means controlled by flow of material through said conduit for producing electrical impulses, a step by step switch having a plurality of contacts and a movable wiper, means for imposing said electrical impulses on said wiper, counting means actuatable by electrical impulses, means electrically connecting certain switch contacts to said counting means, and means responsive to the temperature of the material in the conduit for selectively connecting the remaining switch contacts to said counting means.

2. In combination, a photo-electric cell, means to illuminate said photo-electric cell at predetermined frequency, means to vary the intensity of illumination of said photo-electric cell independently of the frequency of illumination to cause said photo-electric cell to produce an output voltage having an alternating current component, an amplifier, means for impressing the alternating current output voltage of the photo-electric cell upon the input of said amplifier, a rectifier, means for impressing the output voltage of said amplifier on the input of said rectifier, a tetrode, means for impressing direct current voltage from the output of said rectifier on the input of said tetrode to bias negatively the tetrode control electrode, means for impressing alternating current output potential from said amplifier on the input of said tetrode periodically to reduce the negative bias of the tetrode control electrode, an electron discharge relay, and means for impressing the output of said tetrode on the input of said relay to control the latter.

3. In combination, a photo-electric cell, means to illuminate said photo-electric cell at predetermined frequency, means to vary the intensity of illumination of said photo-electric cell independently of the frequency of illumination to cause said photo-electric cell to produce an output voltage having an alternating current component, an amplifier, means for impressing the alternating current output voltage of the photo-electric cell upon the input of said amplifier, a rectifier, means for impressing the output voltage of said amplifier on the input of said rectifier, a tetrode, means for impressing direct current voltage from the output of said rectifier on the input of said tetrode to bias negatively the tetrode control electrode, means for impressing alternating current output potential from said amplifier on the input of said tetrode periodically to reduce the negative bias of the tetrode control electrode, a step by step switch, operating means therefor controlled by the output of said tetrode, two conductors connected to the contacts of said switch dividing said contacts into alternate groups, an electron discharge relay having a control electrode connected to the wiper of said switch, means for intermittently grounding said switch contacts, and means normally applying negative potential to said control electrode.

4. In combination, a photo-electric cell, means to illuminate said photo-electric cell at predetermined frequency, means to vary the intensity of illumination of said photo-electric cell independently of the frequency of illumination to cause said photo-electric cell to produce an output voltage having an alternating current component, an amplifier, means for impressing the alternating current ouput voltage of the photo-electric cell upon the input of said amplifier, a rectifier, means for impressing the output voltage of said amplifier on the input of said rectifier, a tetrode, means for impressing direct current voltage from the output of said rectifier on the input of said tetrode to bias negatively the tetrode control electrode, means for impressing alternating current output potential from said amplifier on the input of said tetrode periodically to reduce the negative bias of the tetrode control electrode, a step by step switch having a plurality of contacts and a movable wiper, operating means for said wiper controlled by the output of said tetrode, a first and a second conductor connected alternately to groups of successive contacts, an electron discharge relay, means electrically connecting said wiper to the control electrode of said relay, means for impressing negative potential on the control electrode of said relay, and means for intermittently grounding said groups of contacts individually.

5. In combination, a photo-electric cell, means to illuminate said photo-electric cell at predetermined frequency, means to vary the intensity of illumination of said photo-electric cell independently of the frequency of illumination to cause said photo-electric cell to produce an output voltage having an alternating current component, an amplifier, means for impressing the alternating current output voltage of the photo-electric cell upon the input of said amplifier, a rectifier, means for impressing the output voltage of said amplifier on the input of said rectifier, a tetrode, means for impressing direct current voltage from the output of said rectifier on the input of said tetrode to bias negatively the tetrode control electrode, means for impressing alternating current output potential from said amplifier on the input of said tetrode periodically to reduce the negative bias of the tetrode control electrode, a first step by step switch having a first and a second set of contacts and a movable wiper for each set, actuating means for said wipers controlled by the output of said tetrode, a first and a second conductor connected alternately to successive contacts of said first group, means grounding a contact of said second set, a second step by step switch having a plurality of contacts and a movable wiper, actuating means for said second switch wiper operable upon engagement of the second wiper of the first switch with the grounded contact of said second set of the first switch contacts, means connecting said first and second conductors with selected contacts of said second switch, a second tetrode having its control electrode connected to the second wiper of the first switch and its output circuit connected to the operating means for the second switch, an electron discharge relay, means electrically connecting the first wiper of the first switch to the control electrode of said relay, and means for impressing negative potential on the control electrode of said relay.

6. In combination, a photo-electric cell, means to illuminate said photo-electric cell at predetermined frequency, means to vary the intensity of illumination of said photo-electric cell independently of the frequency of illumination to cause said photo-electric cell to produce an output voltage having an alternating current component, an amplifier, means for impressing the alternating current output voltage of the photo-electric cell upon the input of said amplifier, a rectifier, means for impressing the output voltage of said amplifier on the input of said rectifier, a tetrode, means for impressing direct current voltage from the output of said rectifier on the input of said tetrode to bias negatively the tetrode control electrode, means for impressing alternating current output potential from said amplifier on the input of said tetrode periodically to reduce the negative bias of the tetrode control electrode, an electron discharge relay controlled by the output of said tetrode, a step by step switch having a plurality of contacts and a movable wiper, means controlled by said relays for supplying current impulses to said wiper, a counter, electro-magnetic actuating means therefor, means electrically connecting selected switch contacts to said actuating means, and temperature-responsive means for selectively connecting the remaining switch contacts to said actuating means.

FORREST LE GRAND BRYANT.